US012012754B2

(12) United States Patent
Ye et al.

(10) Patent No.: US 12,012,754 B2
(45) Date of Patent: Jun. 18, 2024

(54) ANTI-SEISMIC ASSEMBLY AND MODULAR BUILDING

(71) Applicant: GUANGDONG CIMC BUILDING CONSTRUCTION CO., LTD., Jiangmen (CN)

(72) Inventors: Weiqiang Ye, Jiangmen (CN); Jieyuan Wu, Jiangmen (CN); Zhaotie Luo, Jiangmen (CN)

(73) Assignee: GUANGDONG CIMC BUILDING CONSTRUCTION CO., LTD., Jiangmen (CN)

( * ) Notice: Subject to any disclaimer, the term of this patent is extended or adjusted under 35 U.S.C. 154(b) by 301 days.

(21) Appl. No.: 17/637,053

(22) PCT Filed: Aug. 21, 2020

(86) PCT No.: PCT/CN2020/110600
§ 371 (c)(1),
(2) Date: Feb. 21, 2022

(87) PCT Pub. No.: WO2021/032202
PCT Pub. Date: Feb. 25, 2021

(65) Prior Publication Data

US 2022/0298784 A1 Sep. 22, 2022

(30) Foreign Application Priority Data

Aug. 22, 2019 (CN) ........................ 201910779506.X

(51) Int. Cl.
*E04B 1/98* (2006.01)
*E04B 2/96* (2006.01)
(Continued)

(52) U.S. Cl.
CPC ................ *E04B 1/98* (2013.01); *E04B 2/967* (2013.01); *E06B 3/26* (2013.01); *E06B 5/10* (2013.01)

(58) Field of Classification Search
None
See application file for complete search history.

(56) References Cited

U.S. PATENT DOCUMENTS 4,276,725 A * 7/1981 Ash ........................... E04B 1/98 52/167.9
4,614,069 A * 9/1986 Tanikawa .................. E04B 2/96 52/475.1

(Continued)

FOREIGN PATENT DOCUMENTS

CN 105525712 A 4/2016
CN 105756217 A 7/2016

(Continued)

OTHER PUBLICATIONS

International Patent Application No. PCT/CN2020/110600; Int'l Written Opinion and Search Report; dated Nov. 20, 2020; 8 pages.

*Primary Examiner* — Joshua K Ihezie
(74) *Attorney, Agent, or Firm* — BakerHostetler

(57) ABSTRACT

An aseismic assembly and a modular building are provided in the present disclosure. The aseismic assembly is provided between a main frame and a displaceable frame spaced apart from the main frame. The aseismic assembly includes a fixed member and a movable member. The fixed member is disposed on a lower surface of the top portion of the main frame. The movable member is used to interconnect the fixed member and the displaceable frame, wherein the bottom portion of the movable member is inserted into the top portion of a post of the displaceable frame. The movable member is movable relative to the displaceable frame along a height direction of the main frame. The top portion of the (Continued)

movable member is connected to the fixed member. The movable member is movable relative to the fixed member along a horizontal direction.

16 Claims, 6 Drawing Sheets

(51) Int. Cl.

| | |
|---|---|
| ***E06B 3/26*** | (2006.01) |
| ***E06B 5/10*** | (2006.01) |

(56) References Cited

U.S. PATENT DOCUMENTS

| | | | | |
|---|---|---|---|---|
| 5,361,549 | A * | 11/1994 | Betts | E04B 1/98<br>49/141 |
| 8,490,922 | B2 * | 7/2013 | Benthien | F16B 37/065<br>244/119 |
| 2004/0255535 | A1 | 12/2004 | Herren | |
| 2007/0151192 | A1 | 7/2007 | Herren | |
| 2019/0271155 | A1 * | 9/2019 | Gilbertson | H02G 3/386 |

FOREIGN PATENT DOCUMENTS

| | | | |
|---|---|---|---|
| CN | 105525712 | B | 10/2017 |
| CN | 105756217 | B | 11/2017 |
| CN | 208347083 | U | 1/2019 |
| CN | 208934197 | U | 6/2019 |
| CN | 110565827 | A | 12/2019 |
| CN | 211499271 | U | 9/2020 |

* cited by examiner

ANTI-SEISMIC ASSEMBLY AND MODULAR BUILDING

CROSS-REFERENCE TO RELATED APPLICATIONS

This application is the National Stage of International Patent Application No. PCT/CN2020/110600, filed on Aug. 21, 2020, which claims the priority to Chinese Patent Application No. 201910779506.X, filed on Aug. 22, 2019, the disclosures of which are incorporated herein by reference in their entireties.

TECHNICAL FIELD

The present disclosure relates generally to the field of construction technology, and specifically to an aseismic assembly and an aseismic device, and a modular building with the aseismic device.

BACKGROUND

Windows or curtain walls are maintenance structure systems composed of panels and supporting structures. Typically, windows and curtain walls are fixed to the main frame. When the main frame is displaced, the windows or curtain walls will follow the main frame to be displaced together. When the main frame undergoes a larger displacement under the action of earthquake or other working conditions, it is a challenge to the ability of the windows or curtain wall structure in displacement absorption. When the displacement of the main frame exceeds the displacement that the windows or curtain walls can absorb, it will cause damage to the windows or curtain wall structure, including damage, falling off of the panel, and distortion, deformation or even overturning and falling off of the frame.

As shown in FIG. 1, the entire curtain wall 2 is fixed to the frame 1. The C-shaped steel 3 is welded to the frame 1, and the entire curtain wall 2 is fixed to the C-shaped steel 3 by bolts. However, this operation results in a completely fixed structure formed by the curtain wall and the main frame.

As shown in FIG. 2, the curtain wall unit 4 is hung on a steel mount 6 by a hanger 5, and the steel mount 6 is welded on the frame. The curtain wall unit 4 can achieve slight sliding through the grooves of the hanger 5, but it cannot adapt to the displacement that is relatively large or under earthquake conditions.

Therefore, there is a need to provide an aseismic assembly, an aseismic device, and a modular building with the aseismic device to at least partially solve the above-mentioned problems.

SUMMARY

A series of simplified concepts is introduced into the portion of Summary, which would be further illustrated in the portion of the detailed description. The Summary of the present disclosure does not mean attempting to define the key feature and essential technical feature of the claimed technical solution, let alone determining the protection scope thereof.

In order to at least partially solve the above-mentioned problem, according to the first aspect of the present disclosure, an aseismic assembly used to be disposed between a main frame and a displaceable frame spaced apart from the main frame is provided. The displaceable frame is provided with a panel and includes a post. The aseismic assembly includes:

- a fixed member configured to be disposed on a lower surface of the top of the main frame; and
- a movable member configured for interconnecting the fixed member and the displaceable frame,
- wherein, a bottom portion of the movable member is connected to the post and the movable member is movable relative to the displaceable frame along a height direction of the main frame, and a top portion of the movable member is connected to the fixed member and the movable member is movable relative to the fixed member along a horizontal direction.

With the aseismic assembly of the present disclosure, the movable member can be movable relative to the displaceable frame along the height direction of the main frame, and movable relative to the fixed member along the horizontal direction, so that displacement between the main frame and the displaceable frame can occur along both the horizontal direction and the height direction to avoid collision or squeeze between the displaceable frame and the main frame, which protects the displaceable frame from being damaged and counteracts the inter-story displacement under the action of earthquake or the deformation of the main frame under the action of other working conditions.

Alternatively, the bottom portion of the movable member is inserted into the top portion of the post. Thus, it is possible to make operation simple and installation easy.

Alternatively, the fixed member includes:

a first connecting plate configured to be connected to the lower surface of the top of the main frame; and a sliding groove configured to be connected to the first connecting plate such that the movable member is slidable in the sliding groove.

Alternatively, the fixed member further includes a first connecting member and a first toothed gasket. A surface of the first toothed gasket facing the first connecting plate has a plurality of teeth. A surface of the first connecting plate facing away from the main frame has a plurality of teeth. The plurality of teeth of the first toothed gasket are engaged with the plurality of teeth of the first connecting plate. The first connecting member is connected to the first connecting plate through the first toothed gasket. In this way, it is possible to enhance the strength of the connection between the first connecting plate and the top of the main frame.

Alternatively, the movable member includes:

a sliding portion configured to be disposed in the sliding groove including an inner wall surface facing toward the sliding portion, the longitudinal section of the sliding portion being a substantially cross shape, the sliding portion including a free end abutting against the inner wall surface; and a first inserting portion configured to be connected to the sliding portion, the top portion of the post having an opening, the first inserting portion being inserted into the post from the opening, the first inserting portion being movable relative to the displaceable frame along the height direction.

Alternatively, the movable member further includes a first positioning portion positioned between the sliding portion and the first inserting portion and extending obliquely outward and upward from the top of the first inserting portion so as to prevent the displaceable frame from moving upward. In this way, it is possible to protect the aseismic assembly from damage against the displaceable frame.

Alternatively, a supporting member is further included, comprising:

a second connecting plate configured to be connected to a bottom portion of the main frame; and a second inserting portion configured to be connected to the second connecting plate so as to be inserted into the bottom of the displaceable frame and connected to the bottom of the displaceable frame.

In this way, the weight of the displaceable frame and the panel is loaded on the bottom portion of the main frame, which reduces the downward pulling force applied by the displaceable frame to the top portion of the main frame, and prevents the top portion of the main frame from being damaged.

Alternatively, the supporting member further includes a second connecting member and a second toothed gasket. A surface of the second toothed gasket facing toward the second connecting plate has a plurality of teeth. A surface of the second connecting plate facing away from the main frame has a plurality of teeth. The plurality of teeth of the second toothed gasket are engaged with the plurality of teeth of the second connecting plate. The second connecting member is connected to the second connecting plate through the second toothed gasket. In this way, it is possible to enhance the strength of the connection between the second connecting plate and the bottom of the main frame.

Alternatively, the supporting member further includes a second positioning portion positioned between the second connecting plate and the second inserting portion and extending outward from the bottom of the second inserting portion to abut against the lower surface of the displaceable frame. In this way, it is possible to prevent the displaceable frame from moving downward and thereby to ensure the installation accuracy.

The present disclosure also provides a modular building with an aseismic device. The aseismic device includes a main frame, a displaceable frame, and the aforementioned aseismic assembly.

With the aseismic device and the modular building of the present disclosure, the displacement between the main frame and the displaceable frame can occur along both the horizontal direction and the height direction. Both the main frame and the displaceable frame are capable of improving displacement absorption, which can avoid collision or squeeze between the displaceable frame and the main frame not only in the height direction but also in the horizontal direction, such that the displaceable frame is protected from being damaged, and the inter-story displacement under the action of earthquake or the deformation of the main frame under other working conditions is counteracted.

Alternatively, the displaceable frame is connected to the main frame through an angle steel, and/or the gap between the displaceable frame and the main frame is covered by an elastomer cover. In this manner, it is possible to enhance the structural strength and to ensure the waterproof performance.

BRIEF DESCRIPTION OF THE DRAWINGS

The following drawings are hereby incorporated as part of the present disclosure for the understanding of the present disclosure. The embodiments are illustrated and described in the drawings in order to explain the device and principles of the present disclosure. In the drawings.

Figure 1:
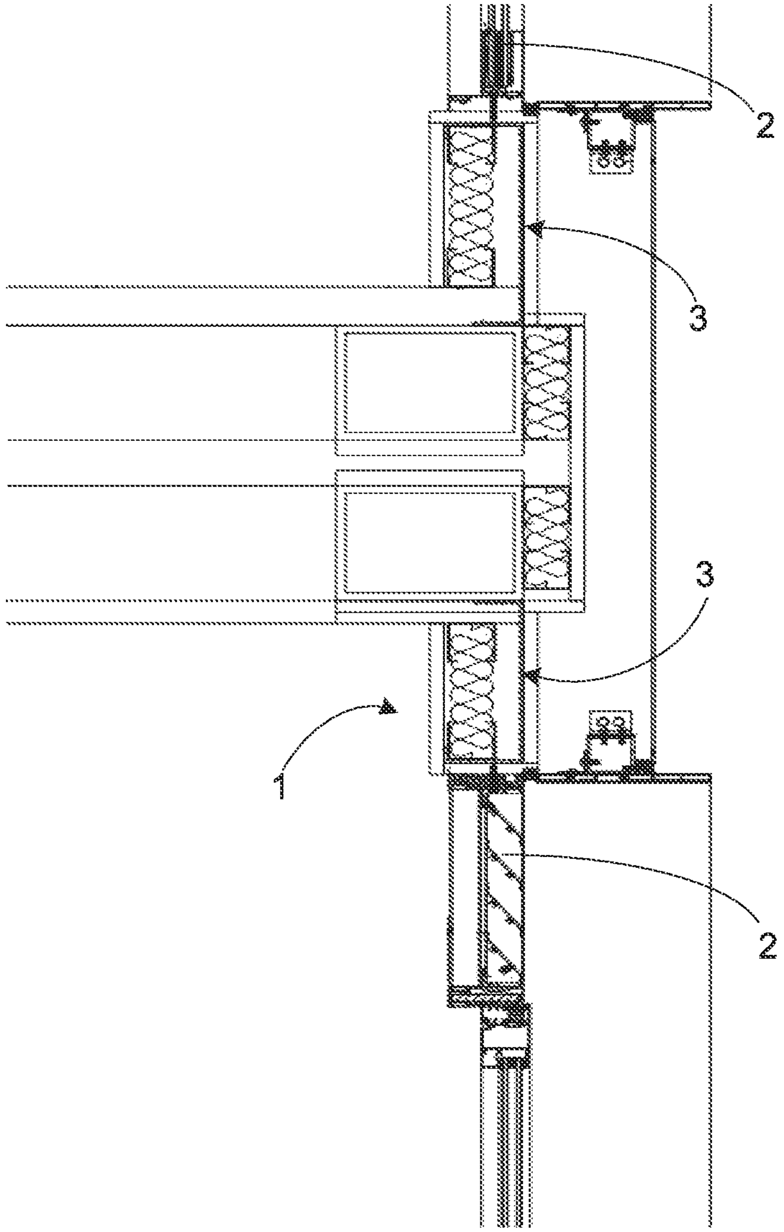
FIG. 1 is a partial schematic diagram of a prior arts connection for a curtain wall and a frame.
Figure 2:
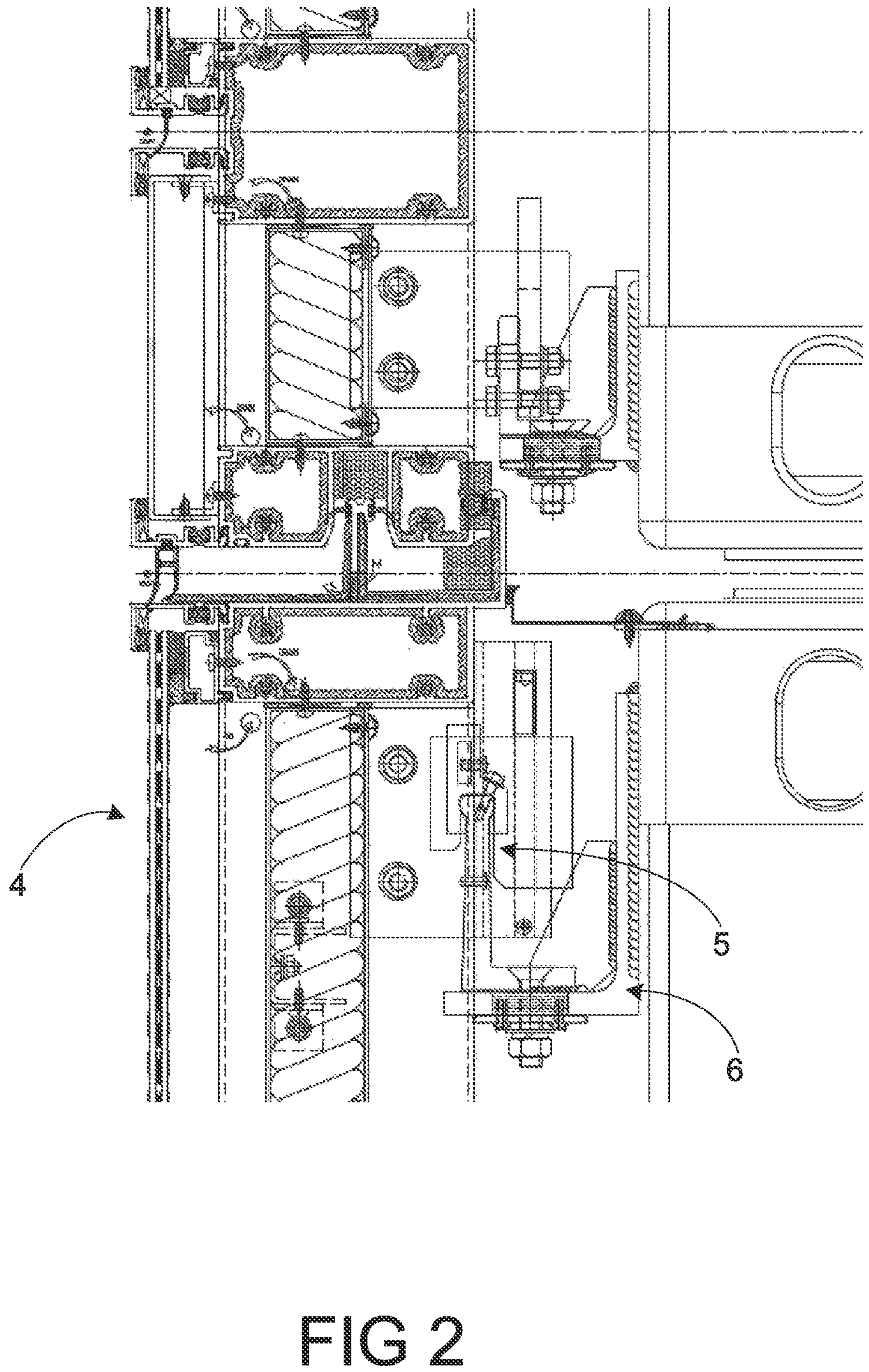
FIG. 2 is a partial schematic diagram of another prior arts connection for a curtain wall and a frame.

| Description of reference signs: | |
|---|---|
| 1: | Framework |
| 2: | Curtain wall |
| 3: | C-shaped steel |
| 4: | Curtain wall unit |
| 5: | Hanger |
| 6: | Steel base |
| 100: | Aseismic device |
| 110: | Main frame |
| 111: | Top portion of the main frame |
| 112: | Bottom portion of the main frame |
| 113: | Opening of the main frame |
| 114: | First angle steel |
| 115: | Pillar of the main frame |
| 120: | Displaceable frame |
| 121: | Top cross beam of the displaceable frame |
| 122: | Bottom cross beam of the displaceable frame |
| 123: | Post of the displaceable frame |
| 124: | Second angle steel |
| 125: | First cavity |
| 126: | First bolt |
| 127: | Transverse decorative wing |
| 128: | Vertical decorative wing |
| 130: | Fixed member |
| 131: | First connecting plate |
| 132: | Sliding groove |
| 133: | First connecting member |
| 134: | First toothed gasket |
| 140: | Movable member |
| 141: | Sliding portion |
| 142: | First inserting portion |
| 143: | First positioning portion |
| 150: | Supporting member |
| 151: | Second connecting plate |
| 152: | Second inserting portion |
| 153: | Second connecting member |
| 154: | Second toothed gasket |
| 155: | Second positioning portion |
| 161: | Glass |
| 162: | Elastomer cover |
| 163: | Elastic component |
| 164: | Screw |

DETAILED DESCRIPTION

In the following description, numerous specific details are set forth in order to provide a more thorough understanding of the present disclosure. However, it is obvious to those skilled in this art that the present disclosure can be implemented without one or more of these details. Some technical features well-known in this art are not described in other examples in order to avoid confusion with the present disclosure.

In order to thoroughly understand the present disclosure, a detailed structure will be proposed in the following description to explain the present disclosure. Obviously, the implementation of this disclosure is not limited to the specific details familiar to those skilled in the art. The preferred embodiments of the present disclosure are described in detail as follows. However, in addition to these detailed descriptions, the present disclosure can also have other embodiments, which should not be construed as being limited to the embodiments proposed here.

It shall be understood that the terminology used herein is for the purpose of describing particular embodiments only and is not intended to be limiting of the disclosure. The singular forms "a," "an," and "the" are intended to include the plural forms as well, unless the context clearly indicates otherwise. The terms "comprising" and/or "including" used in this specification specify the presence of stated features, wholes, steps, operations, elements, and/or components, but do not preclude the presence or addition of one or more other features, wholes, steps, operations, elements, components, and/or combinations thereof. The terms "upper", "lower", "front", "rear", "left", "right" and similar expressions used in this disclosure are for illustrative purposes only and are not limiting.

The ordinal words such as "first" and "second" cited in this disclosure are merely identifications, and do not have any other meanings, e.g., a specific order. Also, for example, the term "first component" itself does not imply the existence of "second component", and the term "second component" itself does not imply the existence of "first component."

Hereinafter, the specific embodiments of the present disclosure will be described in more detail with reference to the accompanying drawings, which show representative embodiments of the present disclosure, and do not limit the present disclosure.

The present disclosure provides an aseismic device 100, which is applicable to buildings in high intensity earthquake zones and earthquake prone areas, and able to improve the capability of windows or curtain walls in displacement absorption. The disclosure also provides an aseismic assembly to achieve the function of absorbing displacement for the windows or the curtain walls.

Figure 3:
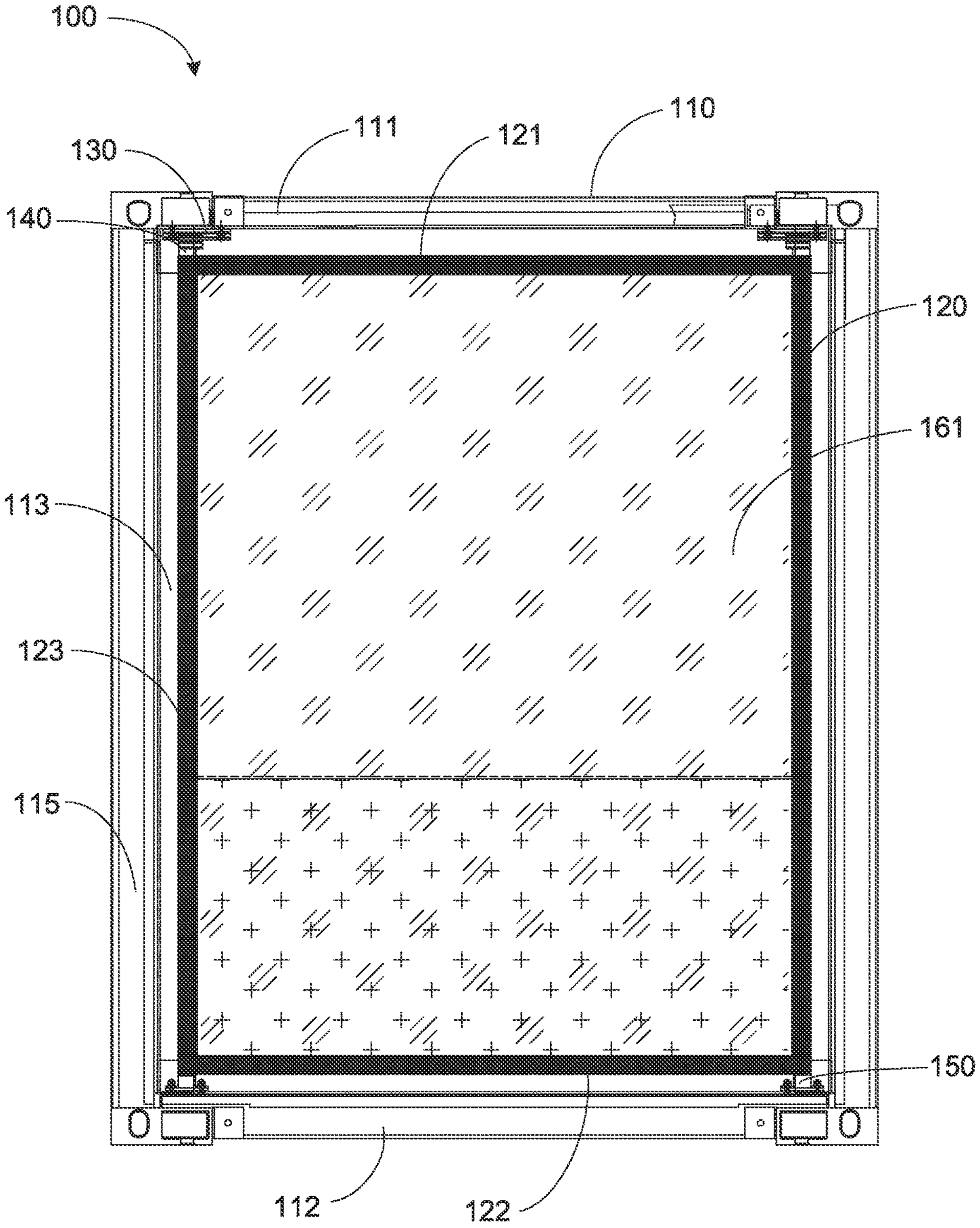
FIG. 3 is a front view of an aseismic device according to a preferred embodiment of the present disclosure.

As shown in FIG. 3, the aseismic device 100 can include a main frame 110, a displaceable frame 120, and the aforementioned aseismic assembly. The aseismic assembly can be disposed between the main frame 110 and the displaceable frame 120 spaced apart from the main frame 110. The displaceable frame 120 can be a frame of for example a window or a curtain wall, and the main frame 110 can be a frame of a building, such as the container body of a container. In this way, the aseismic assembly can be applied to a variety of areas under different conditions, such as mountainous, hilly, or coastal areas, and can adapt to a variety of different climates and environments.

Specifically, the main frame 110 includes a top portion 111, a bottom portion 112, and pillars 115 positioned on the sides. The top portion 111 and the bottom portion 112 of the main frame 110 are spaced apart in a height direction of the main frame 110, and the two sides of the top portion 111 and the bottom portion 112 of the main frame 110 are connected to the two pillars 115, respectively. The main frame 110 can be an end frame of the container body. The top portion 111 of the main frame 110 can include a top-end transverse beam and top corner fittings positioned on both sides of the top-end transverse beam, and the bottom portion 112 of the main frame 110 can include a bottom-end transverse beam and bottom corner fittings positioned on both sides of the bottom-end transverse beam. The pillars 115 can be connected to the top corner fittings and the bottom corner fittings.

The displaceable frame 120 can include a top cross beam 121, a bottom cross beam 122, and posts 123 positioned on the sides. The top cross beam 121 and the bottom cross beam 122 of the displaceable frame 120 are spaced apart in a height direction of the displaceable frame 120, and the two sides of the top cross beam 121 and the bottom cross beam 122 of the displaceable frame 120 are connected to the two posts 123, respectively. A panel is provided in the displaceable frame 120 and can be a transparent or semi-transparent sheet material such as glass that forms a window and a curtain wall. The back of the glass 161 can be provided with colored glaze depending on actual conditions.

Figure 5:
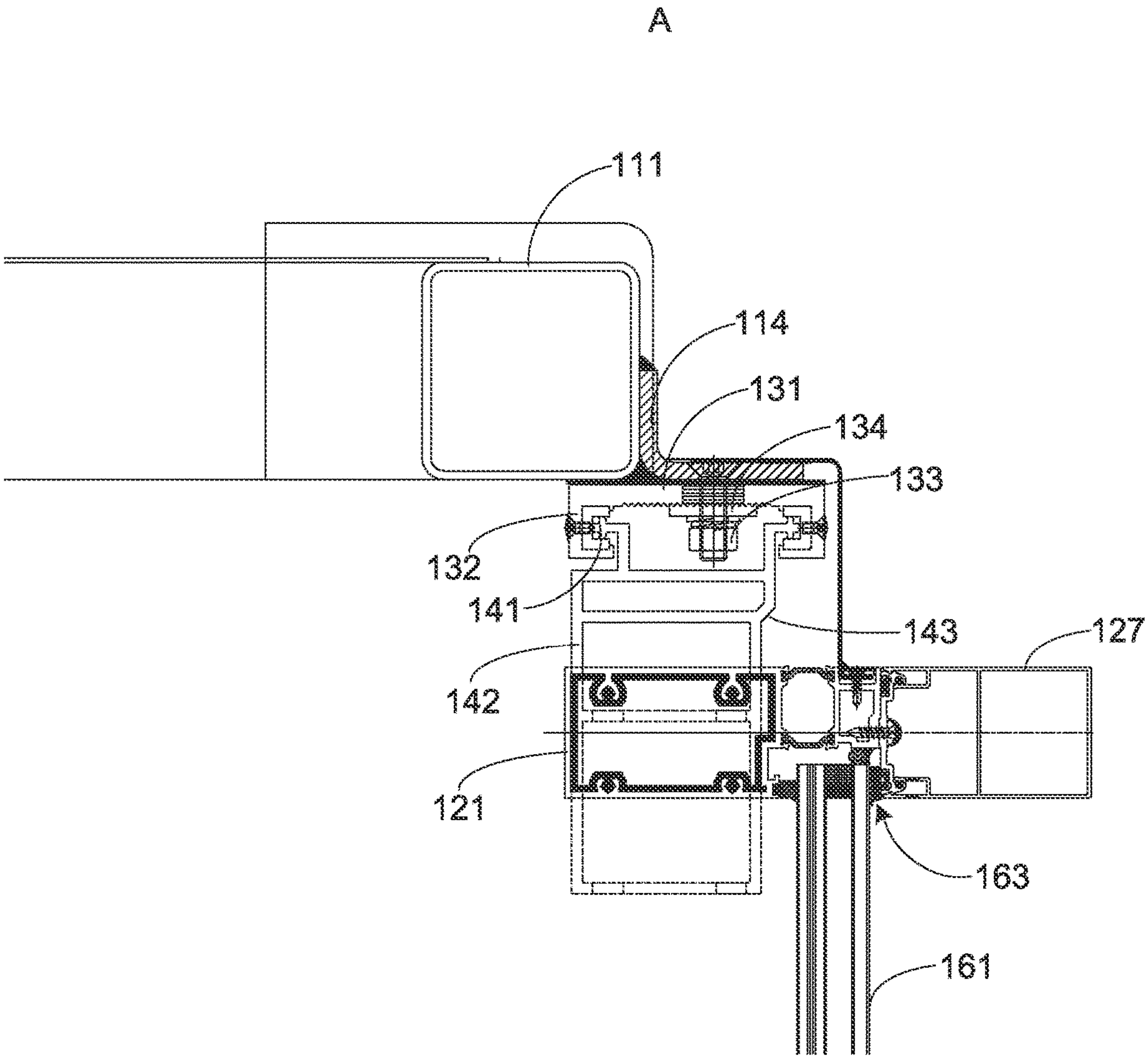
FIG. 5 is a partial enlarged view of region A in FIG. 4.

Alternatively, the glass 161 can be embedded in the top cross beam 121, the bottom cross beam 122, and the two posts 123. The materials of the top cross beam 121, the bottom cross beam 122, and the two posts 123 all can be metal. In order to prevent the glass 161 from being damaged during installation, the glass 161 can be non-rigidly connected with the top cross beam 121, the bottom cross beam 122, and the two posts 123, as shown in FIG. 5. For example, an elastic component 163 can be disposed between the glass 161 and each of the top cross beam 121, the bottom cross beam 122, and the two posts 123. The elastic component 163 can include a soft elastomer sheet and a soft elastomer pad, so that the glass 161 and the metal material are separated by the elastic component 163, and waterproof and precise positioning can also be achieved.

Figure 4:
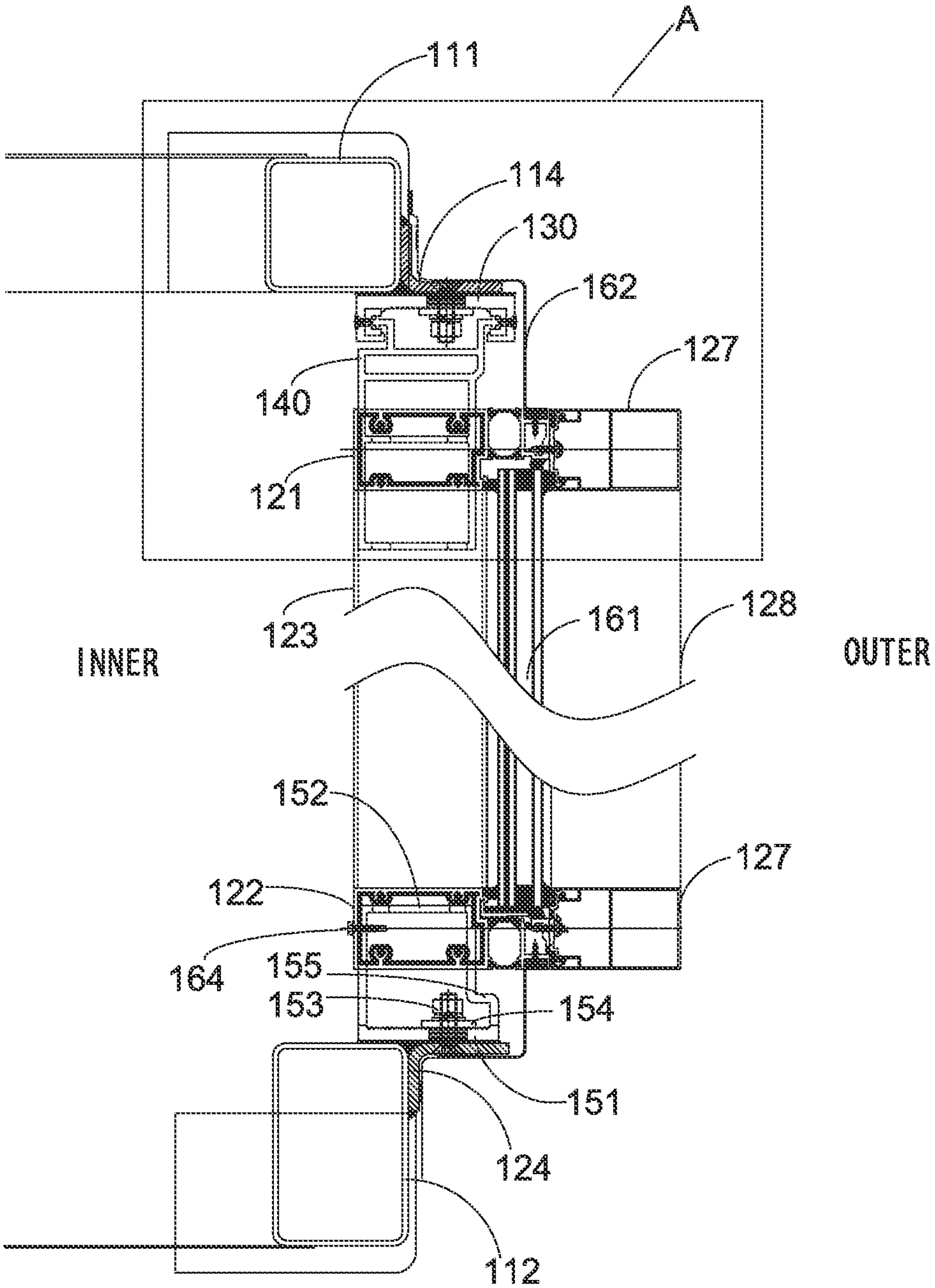
FIG. 4 is a side sectional view of the aseismic device as shown in FIG. 3.
Figure 6:
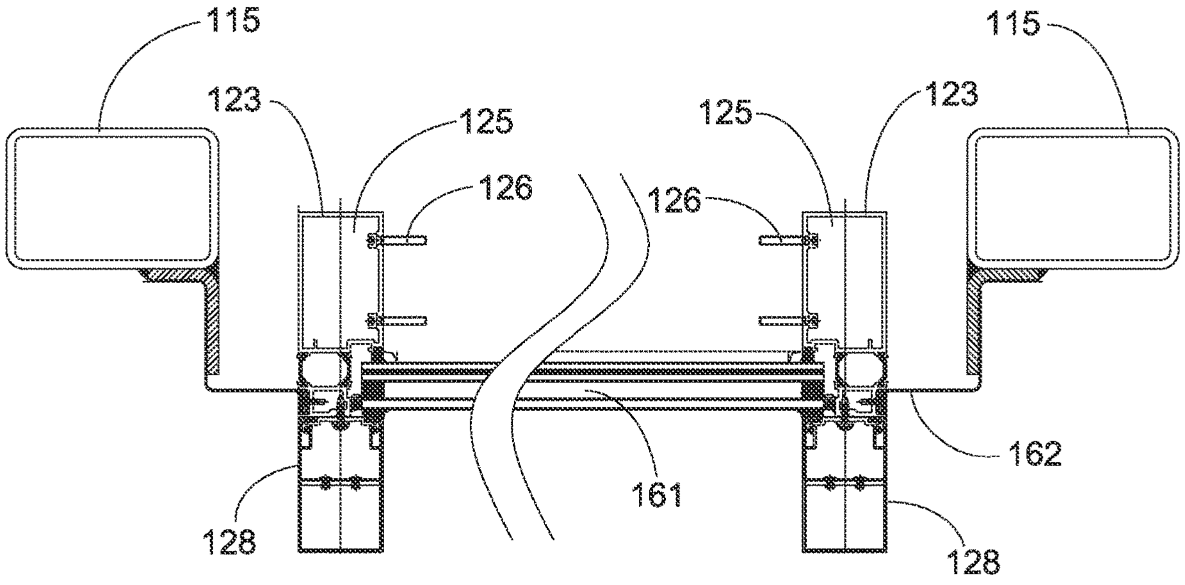
FIG. 6 is a top sectional view of the aseismic device as shown in FIG. 3.

As shown in FIGS. 4 and 6, the exterior of the displaceable frame 120 further can be provided with decorative wings. For example, the main frame 110 and the displaceable frame 120 can be disposed to a container body or a building, and the decorative wings can be positioned on the outer side of the container body or the building relative to the displaceable frame 120. After the glass 161 is embedded into the displaceable frame 120, the decorative wings are then mounted to the displaceable frame 120. The decorative wings can include two transverse decorative wings 127 and two vertical decorative wings 128. The two transverse decorative wings 127 can be positioned on the outer sides of the top cross beam 121 and the bottom cross beam 122, respectively, and the two vertical decorative wings 128 can be positioned on the outer sides of the two posts 123, respectively.

The glass 161 protrudes from the outer surface of the main frame 110 along the length direction of the container body. Certainly, the glass 161 can be not protruding from the outer surface of the main frame 110 along the length direction of the container body depending on the actual situations. For example, the glass 161 can be flush with the outer surface of the main frame 110 along the length direction of the container body, or the glass 161 can be closer to the interior of the container body than the outer surface of the main frame 110 along the length direction of the container body. This not only serves as protection to the glass 161, but also ensures the tidiness of the outer surface of the displaceable frame 120.

Returning now to FIG. 3, the main frame 110 can have an opening 113, and the displaceable frame 120 can be disposed at the opening 113. Preferably, the top portion 111 of the main frame 110 is spaced apart from the top cross beam 121 of the displaceable frame 120, and the bottom portion 112 of the main frame 110 is spaced apart from the bottom cross beam 122 of the displaceable frame 120. Both the top cross beam 121 and the bottom cross beam 122 of the displaceable frame 120 are positioned between the top portion 111 and the bottom portion 112 of the main frame 110 along the height direction of the main frame 110.

In this embodiment, the height direction of the main frame 110 can be parallel to the height direction of the displaceable frame 120, and the width direction of the main frame 110 can be parallel to the width direction of the displaceable frame 120. If the main frame 110 is disposed to the container body, the length direction of the container body can be a direction perpendicular to the paper; the width direction of the container body is parallel to the width direction of the main frame 110; and the height direction of the container body is parallel to the height direction of the main frame 110.

The pillar 115 of the main frame 110 is spaced apart from the post 123 of the displaceable frame 120, and the two posts 123 of the displaceable frame 120 can be positioned between the two pillars 115 of the main frame 110 along the width direction of the main frame 110. In this way, there is a gap between the displaceable frame 120 and the main frame 110. The movable frame 120 thereby is prevented from collision or extrusion with the main frame 110 under an external force.

An aseismic assembly can be provided between the main frame 110 and the displaceable frame 120 to protect the main frame 110 and the displaceable frame 120 from being damaged by collision or squeeze. The aseismic assembly includes a fixed member 130 and a movable member 140. The fixed member 130 can be disposed on the lower surface of the top portion 111 of the main frame 110. The movable member 140 is used to interconnect the fixed member 130 and the displaceable frame 120.

The following is to describe the fixed member 130.

The fixed member 130 can be fixedly disposed on the lower surfaces of two corners, which can include part of the top-end transverse beams and top corner fittings, of the top portion 111 of the main frame 110. Specifically, as shown in FIGS. 4 and 5, the fixed member 130 includes a first connecting plate 131 and a sliding groove 132. The first connecting plate 131 is used to connect with the lower surface of the top portion 111 of the main frame 110.

Preferably, a first angle steel 114 is disposed to the top portion 111 (e.g., the top-end transverse beam and top corner fittings of the main frame 110) of the main frame 110 to facilitate subsequent waterproofing. The longitudinal section of the first angle steel 114 in a plane parallel to the height direction of the main frame 110 can be generally L-shaped, wherein one of the bending sections of the first angle steel 114 can be connected to the outer surface of the top portion 111 of the main frame 110 by welding, and the lower surface of the other bending section of the first angle steel 114 can be connected to the first connecting plate 131 by welding. The two bending sections of the first angle steel 114 are sized changeably, and the first angle steel 114 is positioned to be adjustable on the main frame 110. Thus, the relative position between the first connecting plate 131 and the top portion 111 of the main frame 110 can be adjusted according to actual conditions, so as to adjust the relative position between the fixed member 130 and the top portion 111 of the main frame 110. Of course, the first angle steel 114 can also be connected to the top portion 111 of the main frame 110 in the manner of bolt connection.

Further, in order to enhance the strength of connection between the first connecting plate 131 and the top portion 111 of the main frame 110, the fixed member 130 further includes a first connecting member 133 and a first toothed gasket 134. The surface of the first toothed gasket 134 facing the first connecting plate 131 has a plurality of teeth. The first connecting plate 131 is connected to the first angle steel 114 through the first connecting member 133. In order to ensure the installation accuracy, the surface of the first connecting plate 131 facing away from the main frame 110 has a plurality of teeth, and the plurality of teeth of the first toothed gasket 134 are engaged with the plurality of teeth of the first connecting plate 131; the first connecting member 133 is connected to the first connecting plate 131 through the first toothed gasket 134. When the first connecting plate 131 is mounted to the top portion 111 of the main frame 110, the first connecting plate 131 that has been adjusted in position using a slotted hole may still slide toward the inner side or outer side of the container body, in this way, the first connecting plate 131 is fixed through the first toothed gasket 134, thereby preventing the first connecting plate 131 from sliding, so as to meet the installation accuracy.

The sliding groove 132 can be connected to the first connecting plate 131 such that the movable member 140 is slidable in the sliding groove 132. The movable member 140 can be movably connected with the sliding groove 132. For example, two sliding grooves 132 can be disposed at opposite ends of the first connecting plate 131 with the openings of the two sliding grooves 132 opposing to each other. The sliding groove 132 further can be provided with an elastomer strip of nylon or equivalents. In this way, it is possible to ensure that the movable member 140 not be offset from the sliding groove 132 when moving relative thereto, with enhanced sliding properties and reduced noise.

The following is to describe the movable member 140.

The movable member 140 can include a sliding portion 141 and a first inserting portion 142. The sliding portion 141 can be positioned at the top of the movable member 140, and the first inserting portion 142 can be positioned at the bottom of the movable member. The sliding portion 141 can be disposed in the sliding groove 132. The longitudinal section of the sliding portion 141 in a plane parallel to the height direction of the main frame 110 can be a substantially cross shape. The sliding groove 132 includes an inner wall surface facing the sliding portion 141. The sliding portion 141 includes a free end, and the free end of the sliding portion 141 can abut against the inner wall surface of the sliding groove 132. As such, the sliding portion 141 can be movable relative to the sliding groove 132 along a horizontal direction without being offset from thereto, so that relative displacement occurs between the movable member 140 and the main frame 110. Preferably, the sliding groove 132 can extend in the width direction of the main frame 110. In this embodiment, the sliding portion 141 can be movable relative to the sliding groove 132 along the width direction of the container body, and can be unmovable relative to the sliding groove 132 along both the height direction and length direction of the container body.

The first inserting portion 142 is connected to the sliding portion 141. A connecting portion can be disposed between the sliding portion 141 and the first inserting portion 142. The longitudinal section of the connecting portion in a plane parallel to the height direction of the main frame 110 can be generally inverted "it" shape. The first inserting portion 142 can extend downward from the bottom of the connecting portion. The first inserting portion 142 can be connected with the post 123 of the displaceable frame 120, and the movable member 140 can be movable relative to the displaceable frame 120 along the height direction of the main frame 110. Preferably, the first inserting portion 142 can be inserted into the top portion of the post 123 of the displaceable frame 120. The top portion of the post 123 of the displaceable frame 120 has an opening facing toward the first inserting portion 142. The first inserting portion 142 can be inserted into the post 123 from the opening on the top of the post 123 of the displaceable frame 120, and can be movable relative to the displaceable frame 120 along the height direction of the main frame 110.

Certainly, the first inserting portion 142 can also be connected to the post of the displaceable frame 120 through other connections. For example, in an embodiment not illustrated, the post can also be provided with a sliding groove, wherein the sliding groove can extend along the height direction, and the first inserting portion can be connected to the sliding groove of the post and movable relative to the sliding groove along the height direction of the main frame 110. In this way, relative displacement can occur between the first inserting portion and the post along the height direction. The movement of the first inserting portion can be guided by the sliding groove which also could prevent the movable member becoming offset during movement. Or in another embodiment not illustrated, the first inserting portion can accommodate the top of the post, which can be inserted into the first inserting portion. In this way, the movable member can also be movable relative to the displaceable frame along the height direction of the main frame 110.

Preferably, as shown in FIG. 6, the post 123 can include an upper, first cavity 125. The first cavity 125 is used to accommodate the first inserting portion 142. As a result, the first inserting portion 142 is movable up and down relative to the entire displaceable frame 120 along the height direction, so that the movable member 140 and the entire displaceable frame 120 can be displaced up and down, and thereby the top portion 111 of the main frame 110 is extended and displaced relative to the displaceable frame 120.

The side of the first cavity 125 far away from the main frame 110 is connected to the top cross beam 121 by the first bolt 126. As shown in FIG. 4 and FIG. 5, a sealant can be positioned at the joint of the top cross beam 121 and the post 123 to ensure sealing. The top cross beam 121 is not in contact with the movable member 140 so that the top cross beam 121 does not interfere with the movement of the first inserting portion 142. When the main frame 110 and the displaceable frame 120 are subjected to external forces, the top cross beam 121 can be displaced with the movement of the post 123.

Accordingly, when the main frame 110 and the displaceable frame 120 are subjected to external forces, the top portion 111 of the main frame 110 is extended to make the movable member 140 movable relative to the displaceable frame 120 along the height direction, and the main frame 110 and the displaceable frame 120 are spaced apart. This avoids collision or squeeze between the displaceable frame 120 and the main frame 110 along the height direction, such that the displaceable frame 120 is protected from being damaged and the structural deformation of the main frame 110 is counteracted.

Further, the top of the movable member 140 is connected to the fixed member 130, and the movable member 140 can be movable relative to the fixed member 130 along a horizontal direction. In this embodiment, the "horizontal direction" can be a direction parallel to the width direction of the main frame 110 or a direction parallel to the thickness direction of the main frame 110. Preferably, the movable member 140 can be movable relative to the fixed member 130 along the width direction of the container body, and unmovable relative to the fixed member 130 along the length direction of the container body. The displaceable frame 120 can be movable relative to the main frame 110 along the width direction of the container body, so that the displaceable frame 120 and the main frame 110 are displaced along the width direction of the container body and the distance of such displacement can be up to 2%, at least. It is possible to make the window and curtain wall diverse in type and widely applicable.

When the main frame 110 and the displaceable frame 120 are subjected to external forces, the relative displacement between the displaceable frame 120 and the main frame 110 can also be adjustable based on the structural displacement of the container body, and the displaceable frame 120 and the main frame 110 are spaced apart. This avoids collision or squeeze between the displaceable frame 120 and the main frame 110, such that the displaceable frame 120 is protected from being damaged and the structural deformation of the main frame 110 is counteracted.

According to the aseismic assembly of the present disclosure, the bottom of the movable member 140 is inserted into the top of the post 123 of the displaceable frame 120, so that the movable member 140 can be movable relative to the displaceable frame 120 along the height direction of the main frame 110. The top of the movable member 140 can also be movably connected to the fixed member 130 disposed on the main frame 110. In this way, the movable member is capable of being displaced in two directions, so that the displaceable frame 120 can be movable relative to the main frame 110 along the horizontal direction, and the displacement can occur between the main frame 110 and the displaceable frame 120 along both the horizontal direction and the height direction. It is possible to avoid the collision or squeeze between the displaceable frame 120 and the main frame 110 along both the height direction and the horizontal direction, to protect the displaceable frame 120 from being damaged, and to counteract the inter-story displacement under the action of earthquake or the deformation of the main frame 110 under the action of other working conditions.

The movable member 140 further includes a first positioning portion 143 in order to avoid the displaceable frame 120 from damaging the aseismic assembly when the main frame 110 and the displaceable frame 120 are shaken to a greater extent when subjected to a relatively strong earthquake. The first positioning portion 143 is positioned between the sliding portion 141 and the first inserting portion 142, and extends obliquely outward and upward from the top of the first inserting portion 142 to prevent the displaceable frame 120 from moving upward.

As shown in FIG. 3, in order to ensure the strength of connection between the displaceable frame 120 and the main frame 110, the aseismic assembly further includes a supporting member 150 positioned on the upper surface of the bottom portion 112 of the main frame 110 for interconnecting the main frame 110 and the displaceable frame 120. The supporting member 150 can fixedly connect the bottom of the displaceable frame 120 to the bottom of the main frame 110, so that the bottom of the displaceable frame 120 is restricted, and the top thereof is not restricted. When the main frame 110 and the displaceable frame 120 are shaken by an earthquake or external force, it is possible using the aseismic assembly disposed on the top of the displaceable frame 120 to achieve the sliding of the displaceable frame 120 in the horizontal direction, and to protect the displaceable frame 120 and the glass 161 disposed in the displaceable frame 120 from being destroyed against squeezing and deformation. Of course, the bottom of the displaceable frame 120 and the bottom portion 112 of the main frame 110 can also be connected in an unfixed manner so as to provide higher freedom.

Specifically, as shown in FIG. 4, the supporting member 150 includes a second connecting plate 151 and a second inserting portion 152, and the second connecting plate 151 is used to be connected to the bottom portion 112 of the main frame 110.

Similarly, the bottom portion 112 (e.g., the bottom-end transverse beam and bottom corner fittings of the main frame 110) of the main frame 110 is provided with a second angle steel 124 to facilitate subsequent waterproofing. The longitudinal section of the second angle steel 124 in a plane parallel to the height direction of the main frame 110 can be generally L-shaped, wherein one of the bending sections of the second angle steel 124 can be connected to the outer surface of the bottom portion 112 of the main frame 110 by welding, and the upper surface of the other bending section of the second angle steel 124 can be connected to the second connecting plate 151 by welding. The two bending sections of the second angle steel 124 are sized changeably, and the second angle steel 124 is positioned to be adjustable on the main frame 110. Thus, the relative position between the second connecting plate 151 and the bottom portion 112 of the main frame 110 can be adjusted according to actual conditions, so as to adjust the relative position between the displaceable frame 120 and the main frame 110. Of course, the second angle steel 124 can also be connected to the bottom portion 112 of the main frame 110 in the manner of bolt connection.

Further, in order to enhance the strength of connection between the second connecting plate 151 and the bottom portion 112 of the main frame 110, the supporting member 150 further includes a second connecting member 153 and a second toothed gasket 154, and the second connecting plate 151 is connected to the second angle steel 124 through the second connecting member 153. In order to ensure the installation accuracy, the surface of the second toothed gasket 154 facing the second connecting plate 151 has a plurality of teeth, and the surface of the second connecting plate 151 facing away from the main frame 110 has a plurality of teeth, and the plurality of teeth of the second toothed gasket 154 are engaged with the plurality of teeth of the second connecting plate 151; the second connecting member 153 is connected to the second connecting plate 151 through the second toothed gasket 154. In this manner, the second connecting plate 151 that has been mounted to the bottom portion 112 of the main frame 110 and adjusted in position is fixed by the second toothed gasket 154, thereby avoiding the sliding of the second connecting plate 151.

The second inserting portion 152 is used for being inserted into the bottom of the displaceable frame 120. The second inserting portion 152 is connected to the second connecting plate 151, and can extend upward from the top of the second connection plate. The second inserting portion 152 can be inserted into the post 123 from the bottom opening of the post 123 of the displaceable frame 120.

Preferably, the post 123 includes a lower, second cavity. The second cavity is used to accommodate the second inserting portion 152, and the second inserting portion 152 and the second cavity are connected together without relative displacement therebetween. The side of the second cavity far away from the main frame 110 is connected to the bottom cross beam 122 by a second bolt (not shown). A sealant can be positioned at the joint of the bottom cross beam 122 and the post 123 to ensure sealing. The bottom cross beam 122 is not in contact with the supporting member 150 such that the bottom cross beam 122 does not interfere with the second inserting portion 152.

The second inserting portion 152 can also be connected to the bottom of the post 123 of the displaceable frame 120 by a screw 164, so that the bottom of the displaceable frame 120 is fixedly connected to the bottom portion 112 of the main frame 110 to improve the stability of the displaceable frame 120. Thus, the weight of the displaceable frame 120 and the glass 161 is loaded on the bottom portion 112 of the main frame 110, which reduces the downward pulling force applied by the displaceable frame 120 to the top portion 111 of the main frame 110, and prevents the top portion 111 of the main frame 110 from being damaged. In this way, the top portion 111 of the main frame positioned in the key position only serves as a stopper and a displacement-allowing member, which can bear greater weight and is safer in strength.

Further, the supporting member 150 further includes a second positioning portion 155 positioned between the second connecting plate 151 and the second inserting portion 152 and extending outward from the bottom of the second inserting portion 152 to abut against the lower surface of the displaceable frame 120. This can prevent the displaceable frame 120 from moving downward, thereby ensuring the installation accuracy.

As shown in FIG. 4 and FIG. 6, because the displaceable frame 120 and the main frame 110 are spaced apart, there is a gap between the displaceable frame 120 and the main frame 110. In order to prevent dust and rain from falling into the gap between the displaceable frame 120 and the main frame 110, the gap between the displaceable frame 120 and the main frame 110 can be covered by an elastomer cover 162, so that the elastomer cover 162 closes the gap therebetween. The elastomer cover 162 is made from a soft material that can be stretched or compressed such that the elastomer cover 162 does not restrict the displacement of the main frame 110 and the displaceable frame 120. When the main frame 110 undergoes a larger displacement under the action of earthquake or other working conditions, the elastomer cover 162 can be deformable with the shaking of the main frame 110 and the displaceable frame 120.

The first angle steel 114 and the top cross beam 121 of the displaceable frame 120 are connected together by the elastomer cover 162, which can cover the first angle 114, the gap between the first angle steel 114 and the top cross beam 121, and a part of the top cross beam 121 of the displaceable frame 120, so as to ensure waterproof performance. The joint of the elastomer cover 162 and the top cross beam 121 is also waterproofed, thereby preventing water vapor from entering the top cross beam 121 and preventing the top cross beam 121 from rusting.

Similarly, the second angle steel 124 and the bottom cross beam 122 of the displaceable frame 120 can also be connected by the elastomer cover 162, and the pillar 115 of the main frame 110 and the post 123 of the displaceable frame 120 can also be connected together by the elastomer cover 162, so as to achieve the waterproof and dustproof functions. A sealant can also be provided between the displaceable frame 120 and the main frame 110 to seal and protect the maintenance structure forming windows or curtain walls.

When the gap between the displaceable frame 120 and the main frame 110 is covered by the elastomer cover 162, the aseismic assembly can be positioned inside the container body or the building such that it is not exposed to outside, ensuring the cleanliness of the outer surface of the container body and the building and thereby achieving the protection to the aseismic assembly by the elastomer cover 162.

According to the aseismic assembly of the present disclosure, the movable member 140 can be movable in a horizontal direction relative to the fixed member 130 fixedly disposed on the main frame 110, so that the movable member 140 can be movable relative to the main frame 110 in the horizontal direction. A relative displacement occurs between the movable member 140 and the main frame 110, thereby causing the relative displacement between the entire displaceable frame 120 and the main frame 110 in the horizontal direction. A part of the movable member 140 can be inserted into the displaceable frame 120, and the movable member 140 is movable relative to the displaceable frame 120 along the height direction of the main frame 110. The cross beam and post 123 of the displaceable frame 120 and the entire glass 161 cooperate as a whole for their integral displacement, so that the relative displacement between the integral displaceable frame 120 and the main frame 110 occurs in the height direction.

The aseismic device according to the present disclosure can be used in buildings in high intensity earthquake zones and earthquake prone areas, thereby improving the capability of windows or curtain walls disposed to the building in displacement absorption, and ensuring the structural completion of the windows or curtain walls with large inter-story displacements. When the main frame undergoes a larger displacement under the action of earthquake or other working conditions, the displacement can occur between the main frame and the displaceable frame along both the horizontal direction and the height direction. Both the main frame and the displaceable frame are capable of better absorbing displacement, which can avoid collision or squeeze between the displaceable frame and the main frame not only in the height direction but also in the horizontal direction, such that the displaceable frame is protected from being damaged, and the inter-story displacement under the action of earthquake or the deformation of the main frame under the action of other working conditions is counteracted.

The present disclosure also provides a modular building, which can include the above-mentioned aseismic device. The modular building can include a container body of a container. The aseismic device can be disposed at the end of the container body. The main frame can be a frame of a container body.

The modular building according to the present disclosure can be used in buildings in high intensity earthquake zones and earthquake prone areas, thereby improving the capability of windows or curtain walls disposed to the building in displacement absorption, and ensuring the structural completion of the windows or curtain walls with large inter-story displacements. When the main frame undergoes a larger displacement under the action of earthquake or other working conditions, the displacement can occur between the main frame and the displaceable frame along both the horizontal direction and the height direction. Both the main frame and the displaceable frame are capable of better absorbing displacement, which can avoid collision or squeeze between the displaceable frame and the main frame not only in the height direction but also in the horizontal direction, such that the displaceable frame is protected from being damaged, and the inter-story displacement under the action of earthquake or the deformation of the main frame under the action of other working conditions is counteracted.

Unless otherwise defined, the technical and scientific terms used herein have the same meanings as commonly understood by those skilled in the technical field of the present disclosure. The terms used herein are only for describing specific implementation purposes, and are not intended to limit the present disclosure. The terms such as "parts" as used herein can mean a single part or a combination of multiple parts. Terms such as "mounting", "disposing" and the like as used herein encompasses the configuration in which a component is directly attached to another component in addition to the configuration in which a component is attached to another component through an intermediate component. A feature described in one embodiment herein can be applied to another embodiment alone or in combination with other features, unless the feature is not applicable in the other embodiment or otherwise stated.

The present disclosure has been described through the above-mentioned embodiments, but it should be understood that the above-mentioned embodiments are only for the purpose of illustration and description, and are not intended to limit the present disclosure to the scope of the described embodiments. Furthermore, those skilled in the art can understand that this disclosure is not limited to the above-mentioned embodiments, and more variations and modifications can be made in light of the teachings of the present disclosure. These variations and modifications all fall within the scope claimed by the present disclosure as defined in the appended claims and their equivalents.

What is claimed is:

1. An aseismic assembly used to be disposed between a main frame and a displaceable frame spaced apart from the main frame, the displaceable frame being provided with a panel and including a post, wherein the aseismic assembly includes:

a fixed member configured to be disposed on a lower surface of a top portion of the main frame; and a movable member configured for interconnecting the fixed member and the displaceable frame, wherein, a bottom portion of the movable member is connected to the post and the movable member is movable relative to the displaceable frame along a height direction of the main frame, and a top portion of the movable member is connected to the fixed member and the movable member is movable relative to the fixed member along a horizontal direction; wherein the fixed member includes: a first connecting plate configured to be connected to the lower surface of the top of the main frame; and a sliding groove configured to be connected to the first connecting plate such that the movable member is slidable in the sliding groove.

2. The aseismic assembly of claim 1, wherein the bottom portion of the movable member is inserted into a top portion of the post.

3. The aseismic assembly of claim 1, wherein the fixed member further includes a first connecting member and a first toothed gasket, a surface of the first toothed gasket facing toward the first connecting plate having a plurality of teeth, a surface of the first connecting plate facing away from the main frame having a plurality of teeth, the plurality of teeth of the first toothed gasket being engaged with the plurality of teeth of the first connecting plate, the first connecting member being connected to the first connecting plate through the first toothed gasket.

4. The aseismic assembly of claim 1, wherein the movable member includes:

a sliding portion configured to be disposed in the sliding groove including an inner wall surface facing toward the sliding portion, the longitudinal section of the sliding portion being a substantially cross shape, the sliding portion including a free end abutting against the inner wall surface; and a first inserting portion configured to be connected to the sliding portion, the top portion of the post having an opening, the first inserting portion being inserted into the post from the opening, the first inserting portion being movable relative to the displaceable frame along the height direction.

5. The aseismic assembly of claim 4, wherein the movable member further includes a first positioning portion positioned between the sliding portion and the first inserting portion and extending obliquely outward and upward from the top of the first inserting portion so as to prevent the displaceable frame from moving upward.

6. The aseismic assembly of claim 1, further comprising a supporting member, comprising:

a second connecting plate configured to be connected to a bottom portion of the main frame; and a second inserting portion configured to be connected to the second connecting plate so as to be inserted into a bottom of the displaceable frame and connected to the bottom of the displaceable frame.

7. The aseismic assembly of claim 6, wherein the supporting member further includes a second connecting member and a second toothed gasket, a surface of the second toothed gasket facing toward the second connecting plate having a plurality of teeth, a surface of the second connecting plate facing away from the main frame having a plurality of teeth, the plurality of teeth of the second toothed gasket being engaged with the plurality of teeth of the second connecting plate, the second connecting member being connected to the second connecting plate through the second toothed gasket.

8. The aseismic assembly of claim 6, wherein the supporting member further includes a second positioning portion positioned between the second connecting plate and the second inserting portion and extending outward from the bottom of the second inserting portion to abut against a lower surface of the displaceable frame.

9. A modular building, having an aseismic device comprising a main frame, a displaceable frame, and an aseismic assembly used to be disposed between the main frame and the displaceable frame spaced apart from the main frame, the displaceable frame being provided with a panel and including a post, wherein the aseismic assembly includes:

a fixed member configured to be disposed on a lower surface of a top portion of the main frame; and a movable member configured for interconnecting the fixed member and the displaceable frame, wherein a bottom portion of the movable member is connected to the post and the movable member is movable relative to the displaceable frame along a height direction of the main frame, and a top portion of the movable member is connected to the fixed member and the movable member is movable relative to the fixed member along a horizontal direction; wherein the fixed member includes: a first connecting plate configured to be connected to the lower surface of the top of the main frame; and a sliding groove configured to be connected to the first connecting plate such that the movable member is slidable in the sliding groove.

10. The modular building of claim 9, wherein the bottom portion of the movable member is inserted into a top portion of the post.

11. The modular building of claim 9, wherein the fixed member further includes a first connecting member and a first toothed gasket, a surface of the first toothed gasket facing toward the first connecting plate having a plurality of teeth, a surface of the first connecting plate facing away from the main frame having a plurality of teeth, the plurality of teeth of the first toothed gasket being engaged with the plurality of teeth of the first connecting plate, the first connecting member being connected to the first connecting plate through the first toothed gasket.

12. The modular building of claim 9, wherein the movable member includes:

a sliding portion configured to be disposed in the sliding groove including an inner wall surface facing toward the sliding portion, the longitudinal section of the sliding portion being a substantially cross shape, the sliding portion including a free end abutting against the inner wall surface; and a first inserting portion configured to be connected to the sliding portion, the top portion of the post having an opening, the first inserting portion being inserted into the post from the opening, the first inserting portion being movable relative to the displaceable frame along the height direction.

13. The modular building of claim 12, wherein the movable member further includes a first positioning portion positioned between the sliding portion and the first inserting portion and extending obliquely outward and upward from the top of the first inserting portion so as to prevent the displaceable frame from moving upward.

14. The modular building of claim 9, further comprising a supporting member, comprising:

a second connecting plate configured to be connected to a bottom portion of the main frame; and a second inserting portion configured to be connected to the second connecting plate so as to be inserted into a bottom of the displaceable frame and connected to the bottom of the displaceable frame.

15. The modular building of claim 14, wherein the supporting member further includes a second connecting member and a second toothed gasket, a surface of the second toothed gasket facing toward the second connecting plate having a plurality of teeth, a surface of the second connecting plate facing away from the main frame having a plurality of teeth, the plurality of teeth of the second toothed gasket being engaged with the plurality of teeth of the second connecting plate, the second connecting member being connected to the second connecting plate through the second toothed gasket.

16. The modular building of claim 14, wherein the supporting member further includes a second positioning portion positioned between the second connecting plate and the second inserting portion and extending outward from the bottom of the second inserting portion to abut against the lower surface of the displaceable frame.

* * * * *